(12) United States Patent
Khan et al.

(10) Patent No.: US 9,444,534 B2
(45) Date of Patent: Sep. 13, 2016

(54) APPARATUS AND METHOD FOR LOW COMPLEXITY SPATIAL DIVISION MULTIPLE ACCESS IN A MILLIMETER WAVE MOBILE COMMUNICATION SYSTEM

(71) Applicant: Samsung Electronics Co., Ltd., Suwon-si, Gyeonggi-do (KR)

(72) Inventors: Farooq Khan, Allen, TX (US); Sridhar Rajagopal, Plano, TX (US); Zhouyue Pi, Plano, TX (US); Shadi Abu-Surra, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/751,869

(22) Filed: Jan. 28, 2013

(65) Prior Publication Data

US 2013/0202054 A1 Aug. 8, 2013

Related U.S. Application Data

(60) Provisional application No. 61/595,623, filed on Feb. 6, 2012.

(51) Int. Cl.
*H04L 27/00* (2006.01)
*H04B 7/04* (2006.01)
(Continued)

(52) U.S. Cl.
CPC ............. *H04B 7/0456* (2013.01); *H01Q 3/26* (2013.01); *H01Q 21/245* (2013.01); *H04B 7/0408* (2013.01); *H04B 7/0452* (2013.01); *H04B 7/0617* (2013.01); *H04B 7/0697* (2013.01)

(58) Field of Classification Search
CPC .... H04B 3/54; H04B 7/0456; H04B 7/0617; H04L 25/4902; H04L 1/0009; H04L 1/0041; H04L 25/49; H01Q 21/245; H01Q 3/26
USPC ........................................................ 375/259
See application file for complete search history.

(56) References Cited

U.S. PATENT DOCUMENTS 8,073,069 B2 * 12/2011 Mundarath et al. .......... 375/267
8,229,017 B1 * 7/2012 Lee et al. ...................... 375/267
(Continued)

FOREIGN PATENT DOCUMENTS

| EP | 2 343 836 A2 | 7/2011 |
|---|---|---|
| WO | WO 2010/085854 A1 | 8/2010 |
| WO | WO 2010/087749 A1 | 8/2010 |

OTHER PUBLICATIONS

International Search Report dated May 29, 2013 in connection with International Patent Application No. PCT/KR2013/000953, 3 pages.
(Continued)

*Primary Examiner* — Nader Bolourchi

(57) ABSTRACT

A system is configured to perform Spatial Division Multiple Access. The system includes at least one transmitter or receiver capable of polarization alignment. The transmitter includes a baseband precoder configured to precode a signal, an array of sub-array antennas and a plurality of radio frequency (RF) chains. Each RF chain is coupled to a respective antenna sub-array of the array of antennas. The transmitter is configured to perform a method that includes precoding, by a baseband precoder, a signal for spatial division multiple access (SDMA). The method also includes applying, by each of the plurality of radio frequency (RF) chains, a phase shift and beamforming weight to the signal and transmitting the phase shifted and weighted signal by an array of sub-array antennas.

18 Claims, 13 Drawing Sheets

(51) Int. Cl.
*H04B 7/06* (2006.01)
*H01Q 3/26* (2006.01)
*H01Q 21/24* (2006.01)

(56) References Cited

U.S. PATENT DOCUMENTS

| | | |
|---|---|---|
| 2009/0239565 A1 | 9/2009 | Han et al. |
| 2010/0189055 A1 | 7/2010 | Ylitalo |
| 2010/0202553 A1* | 8/2010 | Kotecha et al. ............... 375/267 |
| 2011/0060956 A1 | 3/2011 | Goldsmith et al. |
| 2012/0027111 A1 | 2/2012 | Vook et al. |
| 2013/0044650 A1* | 2/2013 | Barker et al. ................. 370/278 |
| 2013/0158409 A1* | 6/2013 | Kim et al. .................... 600/459 |

OTHER PUBLICATIONS

Written Opinion of International Searching Authority dated May 29, 2013 in connection with International Patent Application No. PCT/KR2013/000953, 5 pages.

Extended European Search Report dated Oct. 21, 2015 in connection with European Application 13747043.1; 5 pages.

Wu, et al.; "Hybrid Beamforming for Two-User SDMA in Millimeter Wave Radio"; XP031838338; IEEE 21st International Symposium; Piscataway, New Jersey; Sep. 26, 2010; pp. 1081-1085.

* cited by examiner

APPARATUS AND METHOD FOR LOW COMPLEXITY SPATIAL DIVISION MULTIPLE ACCESS IN A MILLIMETER WAVE MOBILE COMMUNICATION SYSTEM

CROSS-REFERENCE TO RELATED APPLICATION(S) AND CLAIM OF PRIORITY

The present application claims priority to U.S. Provisional Patent Application Ser. No. 61/595,623 filed Feb. 6, 2012, entitled "LOW COMPLEXITY SPATIAL DIVISION MULTIPLE ACCESS (SDMA) IN A MILLIMETER WAVE MOBILE COMMUNICATION SYSTEM". The content of the above-identified patent documents is incorporated herein by reference.

TECHNICAL FIELD

The present application relates generally to millimeter wave communication networks and, more specifically, to low complexity Spatial Division Multiple Access (SDMA) in a millimeter wave communication network.

BACKGROUND

Mobile communication has been one of the most successful innovations in the $20^{th}$ century. In recent years, the number of subscribers to mobile communication services has exceeded 4.5 billion and is growing fast. At the same time, new mobile communication technologies have been developed to satisfy the increasing needs and to provide more and better mobile communication applications and services. Some examples of such systems are Code Division Multiple Access 2000 (cdma2000) 1xEV-DO systems developed by 3GPP2, WCDMA, HSPA, and Long Term Evolution (LTE) systems developed by $3^{rd}$ Generation Partnership Project (3GPP), and mobile WiMAX systems developed by the Institute of Electrical and Electronics Engineers (IEEE). As more and more people become users of mobile communication systems, and more and more services are provided over these systems, there is an increasing need of a mobile communication system with larger capacity, higher throughput, lower latency, and better reliability.

Millimeter waves are radio waves with wavelength in the range of 1 mm-10 mm, which corresponds to radio frequency of 30 GHz-300 GHz. Per definition by the International Telecommunications Union (ITU), these frequencies are also referred to as the Extremely High Frequency (EHF) band. These radio waves exhibit unique propagation characteristics. For example, compared with lower frequency radio waves, they suffer higher propagation loss, have poorer ability to penetrate objects, such as buildings, walls, foliage, and are more susceptible to atmosphere absorption, deflection and diffraction due to particles (e.g., rain drops) in the air. Alternatively, due to their smaller wave lengths, more antennas can be packed in a relative small area, thus enabling high-gain antenna in small form factor. In addition, due to the aforementioned deemed disadvantages, these radio waves have been less utilized than the lower frequency radio waves. This also presents unique opportunities for new businesses to acquire the spectrum in this band at a lower cost. The ITU defines frequencies in 3 GHz-30 GHz as Super High Frequency (SHF). However, some higher frequencies in the SHF band also exhibit similar behavior as radio waves in the EHF band (i.e., millimeter waves), such as large propagation loss and the possibility of implementing high-gain antennas in small form factor.

Vast amount of spectrum are available in the millimeter wave band. For example, the frequencies around 60 GHz, which are typically referred to as 60 GHz band, are available as unlicensed spectrum in most countries. In the United States, 7 GHz of spectrum around 60 GHz (57 GHz-64 GHz) is allocated for unlicensed use. On Oct. 16, 2003, the Federal Communications Commission (FCC) issued a Report and Order that allocated 12.9 GHz of spectrum for high-density fixed wireless services in the United States (71-76 GHz, 81-86 GHz, and 92-95 GHz excluding the 94.0-94.1 GHz for Federal Government use). The frequency allocation in 71-76 GHz, 81-86 GHz, and 92-95 GHz are collectively referred to as the E-band. It is the largest spectrum allocation ever by FCC—50 times larger than the entire cellular spectrum.

SUMMARY

A transmitter is provided. The transmitter includes a baseband precoder configured to precode a signal. The transmitter also includes an array of sub-array antennas and a plurality of radio frequency (RF) chains configured to apply a phase shift and beamforming weight to the signal. Each RF chain is coupled to a respective antenna sub-array of the array of antennas.

A method for spatial division multiple access is provided. The method includes precoding, by a baseband precoder, a signal for spatial division multiple access (SDMA). The method also includes applying, by each of a plurality of radio frequency (RF) chains, a phase shift and beamforming weight to the signal. The method further includes transmitting the phase shifted and weighted signal by an array of sub-array antennas. Each RF chain is coupled to a respective antenna sub-array of the array of antennas.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
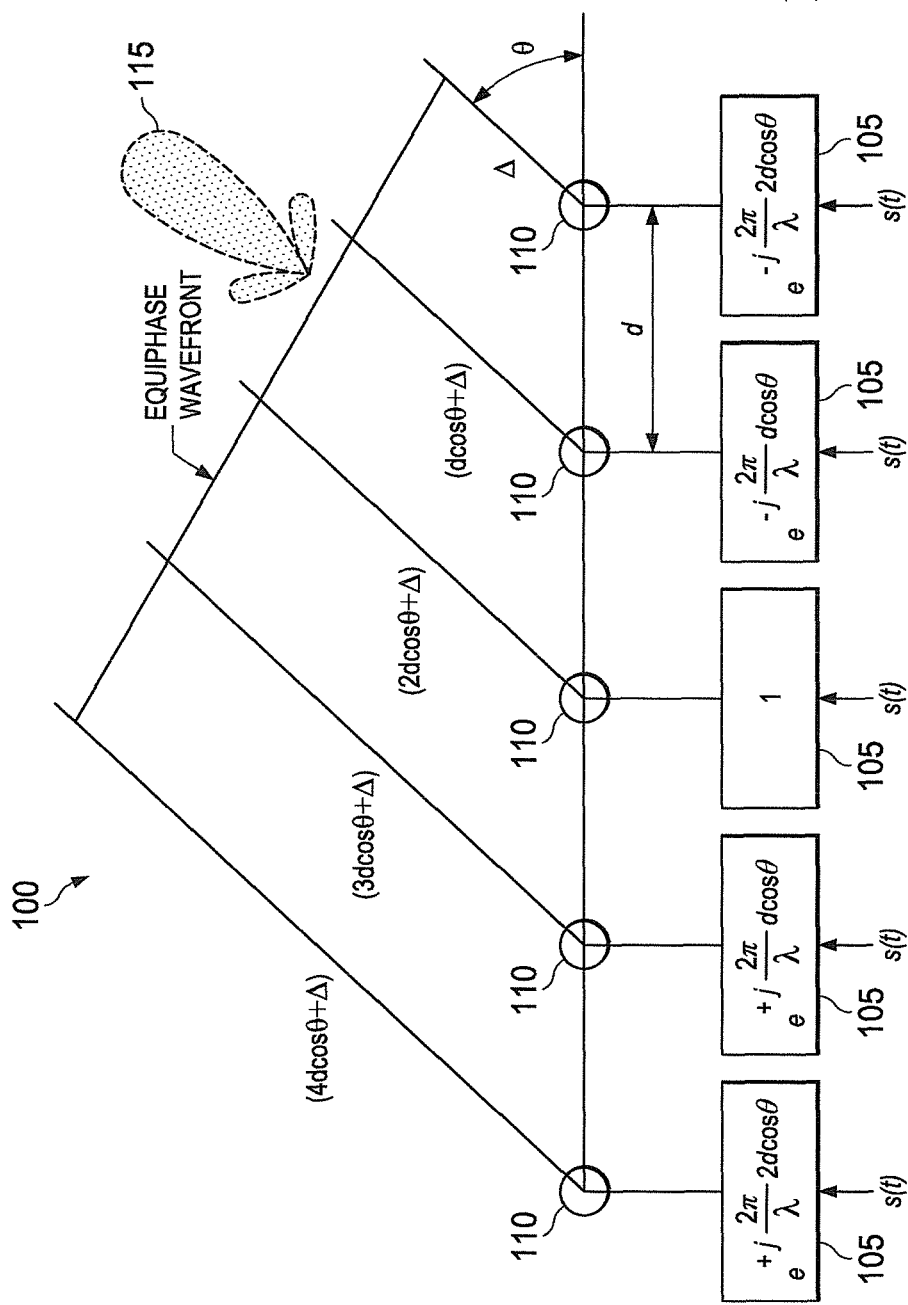
FIG. 1 illustrates dynamic beamforming according to embodiments of the present disclosure.

FIGS. 1 through 17B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Millimeter wave wireless communication using component electronics has existed for many years. Several companies have developed or are developing millimeter wave communication systems that can achieve giga-bps data rate. For example, Asyrmatos Wireless developed a millimeter wave communication system that enables 10 Gbps data transfer over distances of several kilometers. The Asyrmatos transceiver is based on photonics, which provides flexibility of operating in a variety of millimeter wave bands such as 140 GHz (F-Band), 94 GHz (W-Band), 70/80 GHz (E-Band), and 35 GHz(Ka-Band). As another example, GigaBeam Corp. developed multigigabit wireless technologies for the 70 GHz and 80 GHz band. However, these technologies are not suitable for commercial mobile communication due to issues such as cost, complexity, power consumption, and form factor. For example, GigaBeam's WiFiber G-1.25 gigabit per second wireless radio requires a two-foot antenna to achieve the antenna gain required for the point-to-point link quality. The component electronics used in these systems, including power amplifiers, low noise amplifiers, mixers, oscillators, synthesizers, waveguides, and the like, are too big in size and consume too much power to be applicable in mobile communication.

Many engineering and business efforts have been and are being invested to utilize the millimeter waves for short-range wireless communication. A few companies and industrial consortiums have developed technologies and standards to transmit data at giga-bps rate using the unlicensed 60 GHz band within a few meters (up to 10 meters). Several industrial standards have been developed, e.g., WirelessHD technology, ECMA-387, "High Rate 60 GHz PHY, MAC and HDMI PAL", December 2008, and IEEE 802.15.3c, "Wireless Medium Access Control (MAC) and Physical Layer (PHY)Specifications for High Rate Wireless Personal Area Networks (WPANs): Millimeter-wave based Alternative Physical Layer Extension Amendment", October, 2009, with a couple other organizations also actively developing competing short-range 60 GHz giga-bps connectivity technology, such as the Wireless Gigabit Alliance (WGA) and the IEEE 802.11 task group ad (TGad) in Perahia, E.; Cordeiro, C.; Minyoung Park; Yang, L.L.; , "IEEE 802.11ad: Defining the Next Generation Multi-Gbps Wi-Fi," Consumer Communications and Networking Conference (CCNC), 2010 7th IEEE , vol., no., pp. 1-5, 9-12 Jan. 2010, the contents of each are hereby incorporated by reference. Integrated circuit (IC) based transceivers are also available for some of these technologies. For example, researchers in Berkeley Wireless Research Center (BWRC) and Georgia Electronics Design Center (GEDC) have made significant progress in developing low-cost, low-power 60 GHz RFIC and antenna solutions. In Doan, C.H.; Emami, S.; Niknejad, A.M.; Brodersen, R.W.; "Millimeter-wave CMOS design," Solid-State Circuits, IEEE Journal, vol.40, no.1, pp. 144- 155, Jan. 2005, the contents of which are hereby incorporated by reference, researchers from BWRC show that 60 GHz power amplifiers can be designed and fabricated in 130 nm bulk "digital" CMOS. A core team of researchers from BWRC co-founded SiBeam Inc. in 2004 and developed CMOS based RFIC and baseband modem for the WirelessHD technology. It is worth mentioning that the common view is that the biggest challenge of short-range 60GHz connectivity technology is the RFIC. As such, much of the engineering efforts have been invested to develop more power efficient 60 GHz RFICs. Many of the designs and technologies can be transferred to RFIC design for other millimeter wave bands, such as the 70-80-90 GHz band. Although the 60 GHz RFIC today still suffers from low efficiency and high cost, the advancement in millimeter wave RFIC technology points to the direction of higher efficiency and lower cost, which can eventually enable communication over larger distance using millimeter wave RFICs.

In order to overcome the propagation loss at millimeter waves beamforming can be employed. Beamforming is particularly beneficial at millimeter waves as more antennas can be packed in a relative small area, thus enabling high-gain beamforming.

Beamforming is a signal processing technique used for directional signal transmission or reception in a wireless system. The spatial selectivity is achieved by using adaptive receive/transmit beam patterns. When transmitting, a beamformer controls the phase and relative amplitude of the signal at each transmitter antenna to create a pattern of constructive and destructive interference in the wavefront. The receiver combines information from different antennas in such a way that the expected pattern of radiation is preferentially observed. The improvement compared with an omnidirectional reception/transmission is known as the receive/transmit gain. For example, with N transmit antennas, a transmit beamforming gain of $10 \times \log_{10}(N)$ dB can be achieved. This is assuming that the total transmit power from the N antennas is the same as the transmit power from a single omnidirectional antenna. Similarly, with M receive antennas, a receive beamforming gain of $10 \times \log_{10}(M)$ dB can be achieved. When both transmit and receive beamforming is performed with N transmit and M receive antennas a total combined beamforming gain of $10 \times \log_{10}(N \times M)$ dB can be achieved.

FIG. 1 illustrates dynamic beamforming according to embodiments of the present disclosure. The embodiment of the dynamic beamforming shown in FIG. 1 is for illustration only. Other embodiments could be used without departing from the scope of this disclosure.

A transceiver 100 with a uniform linear array (ULA) performs dynamic beamforming by adjusting weights 105 that are based on phase control. By using appropriate phase adjustments to signals transmitted (or received) from multiple antennas 110, a beam 115 can be steered in a particular direction.

Figure 2:
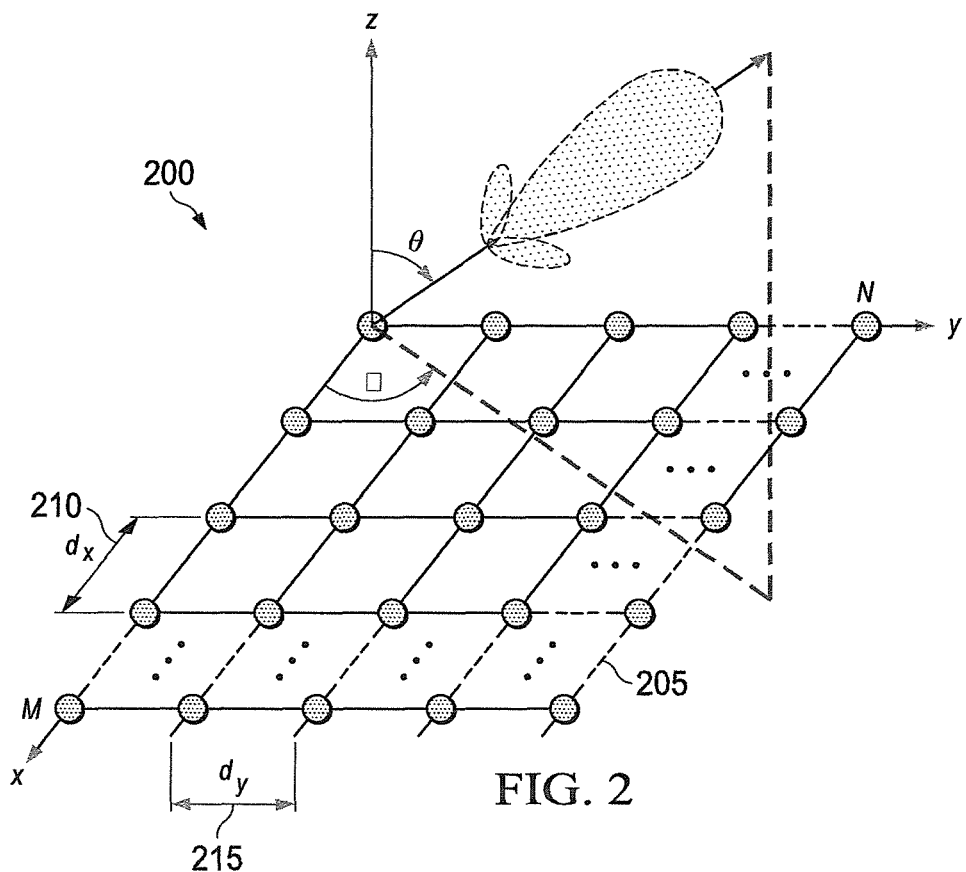
FIG. 2 illustrates a two-dimensional array according to embodiments of the present disclosure.

FIG. 2 illustrates a two-dimensional (2D) array according to embodiments of the present disclosure. The embodiment of the 2-D array 200 shown in FIG. 2 is for illustration only. Other embodiments could be used without departing from the scope of this disclosure.

With an ULA, a transmitter can steer a beam in a single plane containing the line of the antenna elements' centers. In order to steer the beam in any direction, such as horizontal and vertical steering from a base station, the transmitter employs a 2-D antenna array 200 as shown. The array grid 205 can have equal or unequal row spacings ($d_x$) 210 and column spacings ($d_y$) 215.

Figure 3:
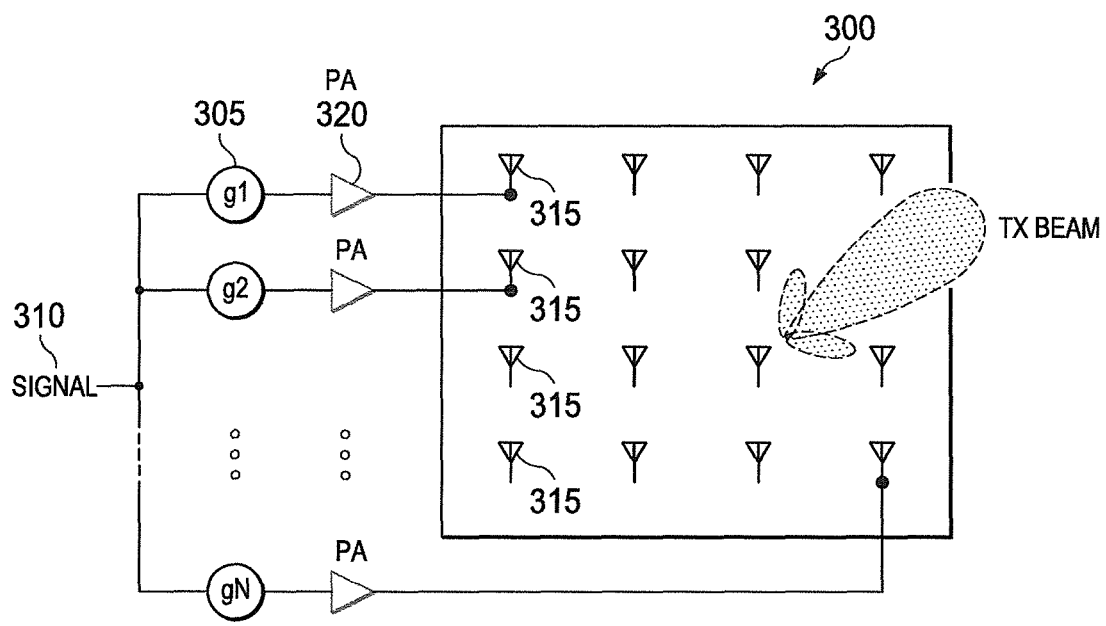
FIG. 3 illustrates a transmit beamforming according to embodiments of the present disclosure.

FIG. 3 illustrates a transmit beamforming according to embodiments of the present disclosure. The embodiments of the transmit beamforming 300 shown in FIG. 3 is for illustration only. Other embodiments could be used without departing from the scope of this disclosure.

A transmitter applies a beamforming weight or gain $g_i$ 305 to the signal 310 transmitted from the ith transmit antenna. The transmitter applies the gain 305 to adjust the phase and relative amplitude of the signal 310 transmitted from each of the transmit antennas 315. The signal 310 can be amplified 320 separately for transmission from each of the transmit antennas 315. In certain embodiments, a single amplifier 320 is used regardless of the number of transmit antennas 315. In certain embodiments, the transmitter includes a smaller number of amplifiers 320 than the number of transmit antennas 315. That is a smaller number of amplifiers 320 than the number of transmit antennas 315 is used. In certain embodiments, the beamforming weights or gains 305 are applied before signal amplification 320. In certain embodiments, the beamforming weights or gains 305 are applied after signal amplification 320.

Figure 4:
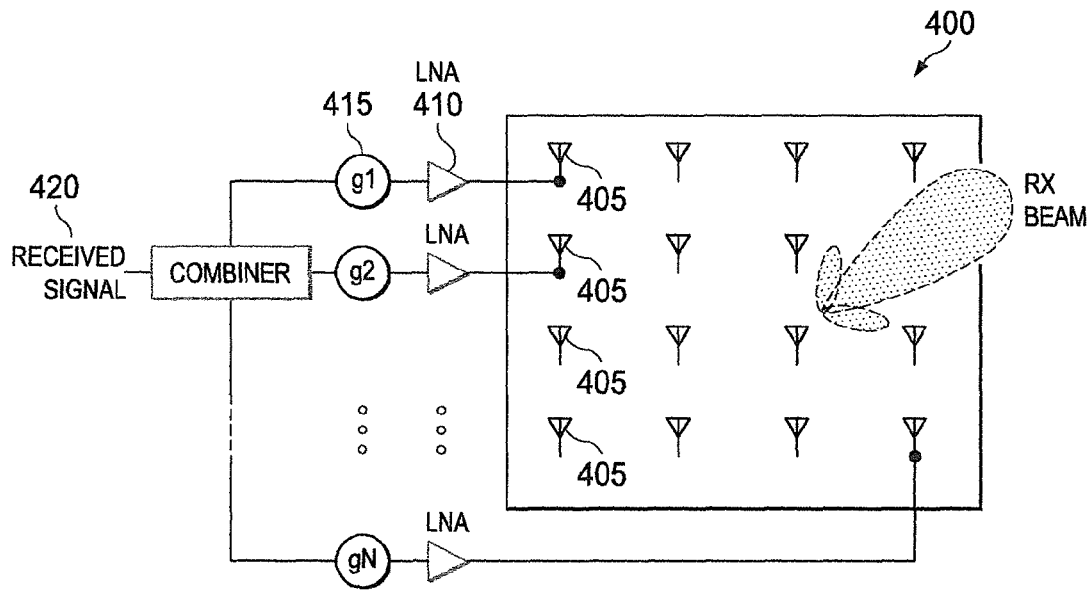
FIG. 4 illustrates a receive beamforming according to embodiments of the present disclosure.

FIG. 4 illustrates a receive beamforming according to embodiments of the present disclosure. The embodiments of the receive beamforming 400 shown in FIG. 4 is for illustration only. Other embodiments could be used without departing from the scope of this disclosure.

Each received signal from each receive antenna 405 is amplified by a low-noise amplifier (LNA) 410. The receiver applies a beamforming weight or gain gi 415 to the signal 420 received and amplified from the ith receive antenna 405. The receiver uses the gain 415 to adjust the phase and relative amplitude of the signal 420 received from each of the transmit antennas 405. The phase and amplitude adjusted signals are combined to produce the received signal 420. The receive beamforming gain 415 is obtained because of coherent or constructive combining of the signals from each receive antenna.

Figure 5:
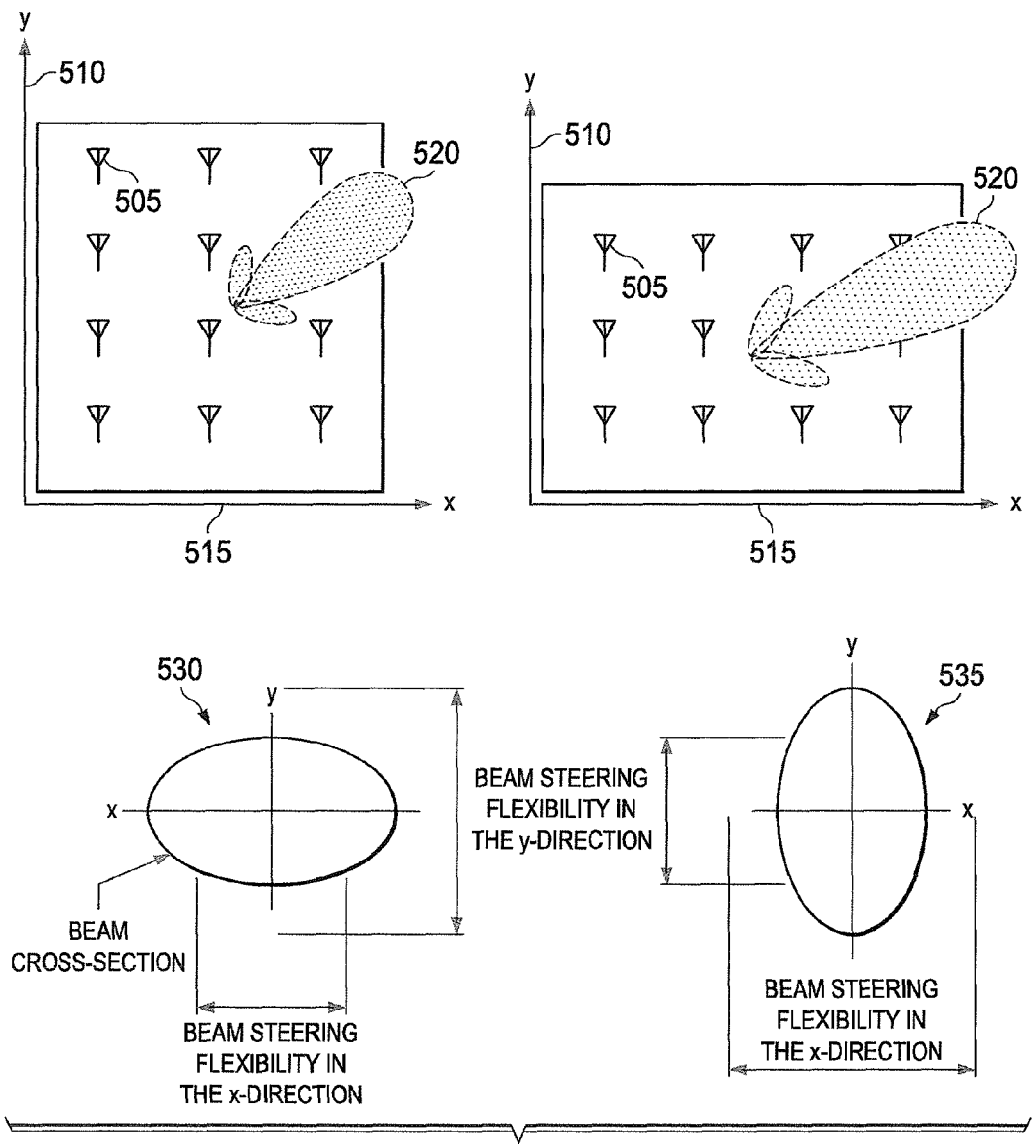
FIG. 5 illustrates a geometry of planar arrays according to embodiments of the present disclosure.

FIG. 5 illustrates a geometry of planar arrays according to embodiments of the present disclosure. The embodiment of the geometry shown in FIG. 5 is for illustration only. Other embodiments could be used without departing from the scope of this disclosure.

The number of antenna elements 505 in the columns and rows determine the beam steering capability along the y-axis 510 and x-axis 515 respectively. For example, with more antennas 505 along the y-axis 510, the beam 520 can be steered 530 with greater granularity and flexibility along the y-axis 510. A higher number of antennas 505 along the x-axis 515 also determines the beamwidth 535 along the x-axis 515 with narrower beams 520 and with increasing number of antennas. Therefore, the planar array geometry for a particular application can be selected based on the beamwidth and beam steering requirements.

Figure 6:
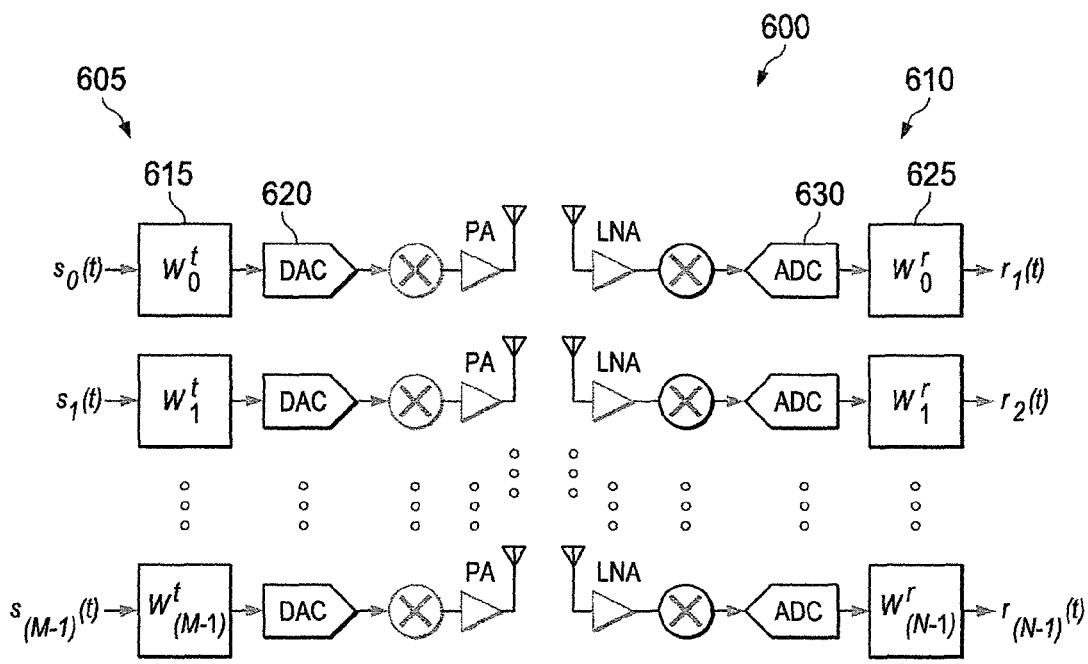
FIG. 6 illustrates digital beamforming according to embodiments of the present disclosure.

FIG. 6 illustrates digital beamforming according to embodiments of the present disclosure. The embodiment of the digital beamforming 600 shown in FIG. 6 is for illustration only. Other embodiments could be used without departing from the scope of this disclosure.

In the example shown in FIG. 6, a transmitter 605 uses digital beamforming techniques to transmit a signal. A receiver 610 uses corresponding digital beamforming techniques to receive the signal.

Different beamforming architectures that enable different tradeoffs between performance, complexity and flexibility are possible. For example, the digital beamforming approach 600 enables optimal capacity for all channel conditions while requiring very high hardware complexity with M (N) full transceivers. This architecture also results in very high system power consumption.

The beamforming weights 615 at the transmitter 605 $W_0^t - W_{(M-1)}^t$ are applied before signal conversion to analog, that is, before the Digital to Analog (DAC) conversion block 620. The beamforming weights 625 at the receiver 610 $W_0^r - W_{(M-1)}^r$ are applied after signal is converted to digital using an Analog to Digital (ADC) converter 630.

Figure 7:
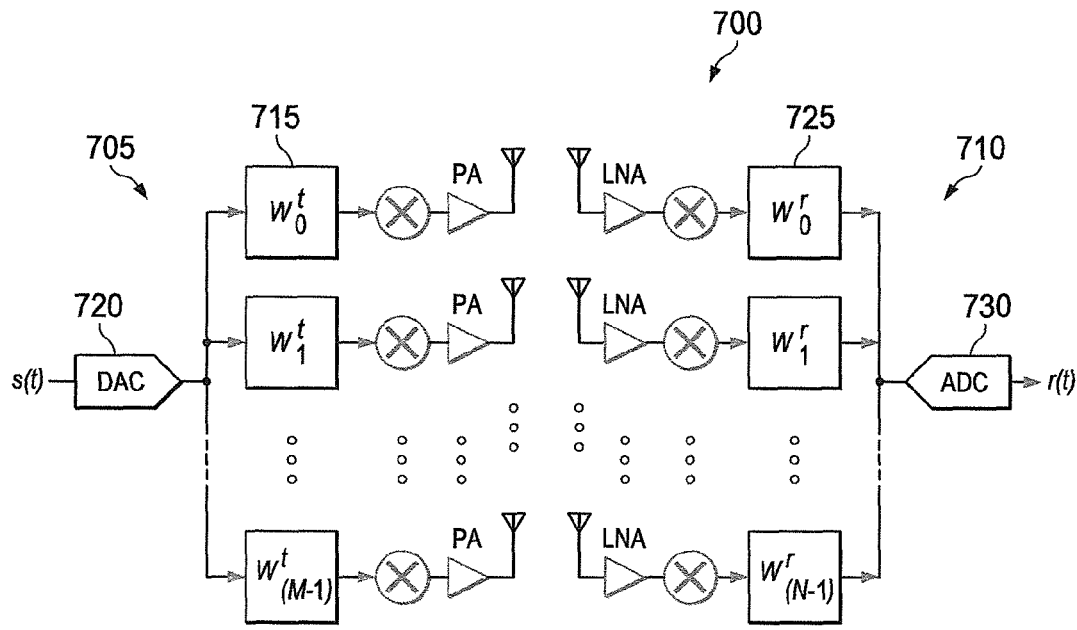
FIG. 7 illustrates analog beamforming according to embodiments of the present disclosure.

FIG. 7 illustrates analog beamforming according to embodiments of the present disclosure. The embodiment of the analog beamforming 700 shown in FIG. 7 is for illustration only. Other embodiments could be used without departing from the scope of this disclosure.

In the example shown in FIG. 7, a transmitter 705 uses analog beamforming techniques to transmit a signal. A receiver 710 uses corresponding analog beamforming techniques to receive the signal.

Analog baseband beamforming 700 reduces the number of data converters (ADC/DAC) providing intermediate complexity and power consumption while losing some flexibility in beamforming control. The beamforming weights 715 at the transmitter 705 $W_0^t - W_{(M-1)}^t$ are applied after signal conversion to analog, that is, after the Digital to Analog (DAC) conversion block 720. The beamforming weights 725 at the receiver 710 $W_0^r - W_{(M-1)}^r$ are applied before signal is converted to digital using an Analog to Digital (ADC) converter 730.

Figure 8:
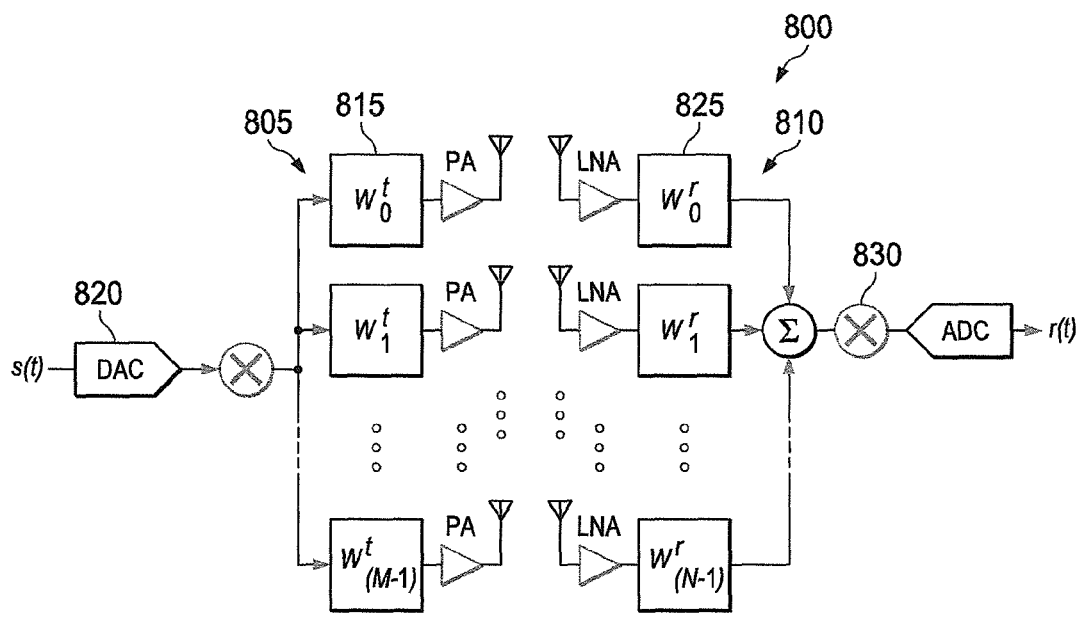
FIG. 8 illustrates Radio Frequency (RF) beamforming according to embodiments of the present disclosure.

FIG. 8 illustrates Radio Frequency (RF) beamforming according to embodiments of the present disclosure. The embodiment of the RF beamforming 800 shown in FIG. 8 is for illustration only. Other embodiments could be used without departing from the scope of this disclosure.

In the example shown in FIG. 8, a transmitter 805 uses analog beamforming techniques to transmit a signal. A receiver 810 uses corresponding analog beamforming techniques to receive the signal.

The RF beamforming 800 reduces the number of mixers required in addition to reducing the number of data converters (ADC/DAC) therefore providing lowest complexity and power consumption. However, this reduction in complexity comes at the expense of reduced flexibility in beamforming control as well as the limited options for multiple access to serve multiple users simultaneously. The beamforming weights 815 at the transmitter 805 $W_0^t$-$W_{(M-1)}^t$ are applied after signal up-conversion to RF frequency, that is, after the mixer block 820. The beamforming weights 825 at the receiver 810 $W_0^r$-$W_{(M-1)}^r$ are applied before the signal is down-converted from RF, that is, before the mixer block 830.

Current peer-to-peer (P2P) millimeter wave standards, such as WirelessHD technology, ECMA-387, IEEE 802.15.3c, and IEEE 802.11ad, employ adaptive antenna arrays both at the transmitter and the receiver. However, the antenna arrays for these systems are used for transmissions to a single user at a time thereby lacking support for serving multiple users simultaneously using Spatial Division Multiple Access (SDMA).

Figure 9:
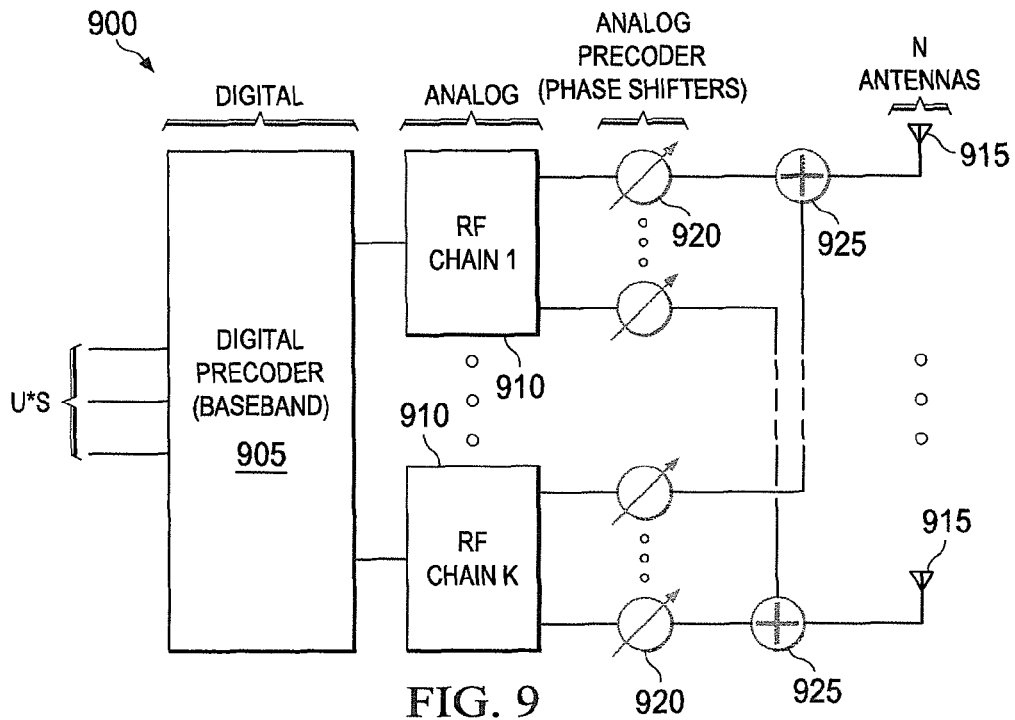
FIG. 9 illustrates a hybrid beamforming architecture according to embodiments of the present disclosure.

FIG. 9 illustrates a hybrid beamforming architecture according to embodiments of the present disclosure. Hybrid beamforming refers to beamforming using the combination of digital precoding in the baseband and RF/analog precoding using phase shifters. The embodiment of the hybrid beamforming architecture 900 shown in FIG. 9 is for illustration only. Other embodiments could be used without departing from the scope of this disclosure.

Hybrid architectures with digital and analog beamforming have also been considered in the past. In these architectures, all RF chains are connected to all antennas using combiners with the number of input equal to the number of RF chains so that the signals are sent from all antennas. In the hybrid beamforming architecture, U is the number of users and S is the number of streams per user. This information (U*S) is sent to a digital baseband precoder 905 of size [US×K], where K is the number of RF chains 910. Each RF chain 910 is connected to the same set of N antennas 915 through a combiner with K inputs. The digital precoder 905, also referred to as a baseband precoder provides a precoded version of the information (U*S) to each of the RF chains 910. The digital precoder 905 can also include a digital weighting of the information (U*S), i.e., a weighting at the baseband. Each RF chain 910 also provides analog weighting, i.e., a weighting at the RF. A phase shift is applied by phase shifters 920. After the phase shift is applied, the signals from each RF chain 910 are combined by combiners 925, which are each coupled to a respective antenna 915.

A receiver receives signals via antennas. Each antenna is coupled to a respective combiner that separates the signal to be processed by a corresponding RF chain. A phase shift also is applied to the signals for each RF chain. Each RF chain processes the signals and applies an RF weighting. The signals for each RF chain are received by a baseband combiner that applies a digital weighting and processes the signal.

Embodiments of the present disclosure illustrate an antenna array system and associated apparatus and methods that provide spatial division multiple access (SDMA) for millimeter wave mobile communications. Although certain embodiments are disclosed in the context of communication with millimeter waves, the embodiments are certainly applicable in other communication medium, e.g., radio waves with frequency of 3 GHz-30 GHz that exhibit similar properties as millimeter waves. In some cases, the embodiments are also applicable to electromagnetic waves with terahertz frequencies, infrared, visible light, and other optical media.

Millimeter waves suffer larger propagation loss than radio waves with lower frequencies. This larger propagation loss can become pronounced when millimeter waves are deployed for local-area (10 m~100 m) or wide-area (>100 m) communication. To compensate for the large propagation loss, antennas with high antenna gains are often used in millimeter wave communication. In recent years, a number of cost-effective antenna and RFIC solutions became available for millimeter wave communication. In addition, due to the small wavelength of millimeter waves (e.g., $\lambda$=5 mm for 60 GHz carrier frequency), the antenna size and separation can be made very small (around $\lambda$/2) for beamforming purposes. The small size and separation of millimeter wave antennas allow a large number of antennas in a small area, which enables high gain antenna implementation in a relatively small area.

For the purpose of illustration, certain embodiments are illustrated using only base stations and mobile stations. However, the mobile communication technology has evolved such that a person with ordinary skill of the art understands that other advanced system topologies, such as relay communication among base stations, direct communication among mobile stations, and different kinds of cooperative communication, can also be supported. The embodiments in this disclosure apply in such communication systems.

Figure 10:
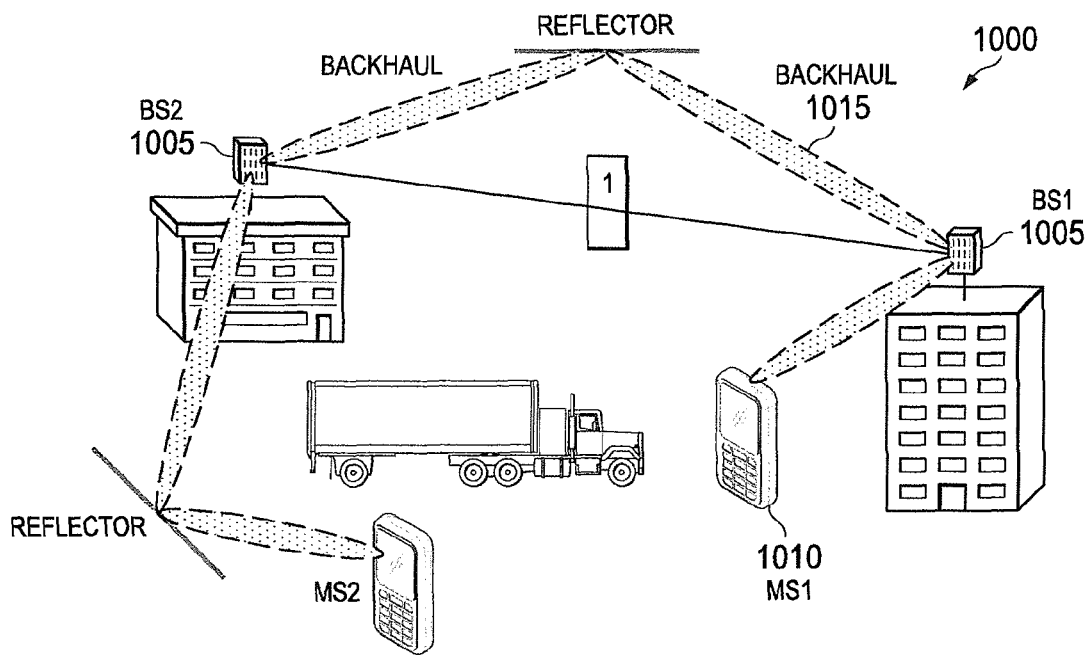
FIG. 10 illustrates a millimeter wave (mmW) mobile communication system according to embodiments of the present disclosure.

FIG. 10 illustrates a millimeter wave (mmW) mobile communication system according to embodiments of the present disclosure. The embodiment of the mmW mobile communication system 1000 is shown for illustration only. Other embodiments could be used without departing from the scope of this disclosure.

In certain embodiments, the mmW mobile communication system 1000 provides communication both from the base station (BS) 1005 to mobile station (MS) 1010 as well as base station 1005 to base station 1005 communication. The base station 1005 to base station 1005 communication can be performed using the same time-frequency resources as for the base station 1005 to mobile station 1010 communication. This is enabled by non-interfering narrow beams enabled by large antenna arrays at mmW frequencies. Another advantage of antenna array based backhaul communication between base stations is that an adaptive non-line-of-sight (NLOS) operation can be enabled for backhaul 1015 in case the LOS is blocked by an obstruction.

Figure 11:
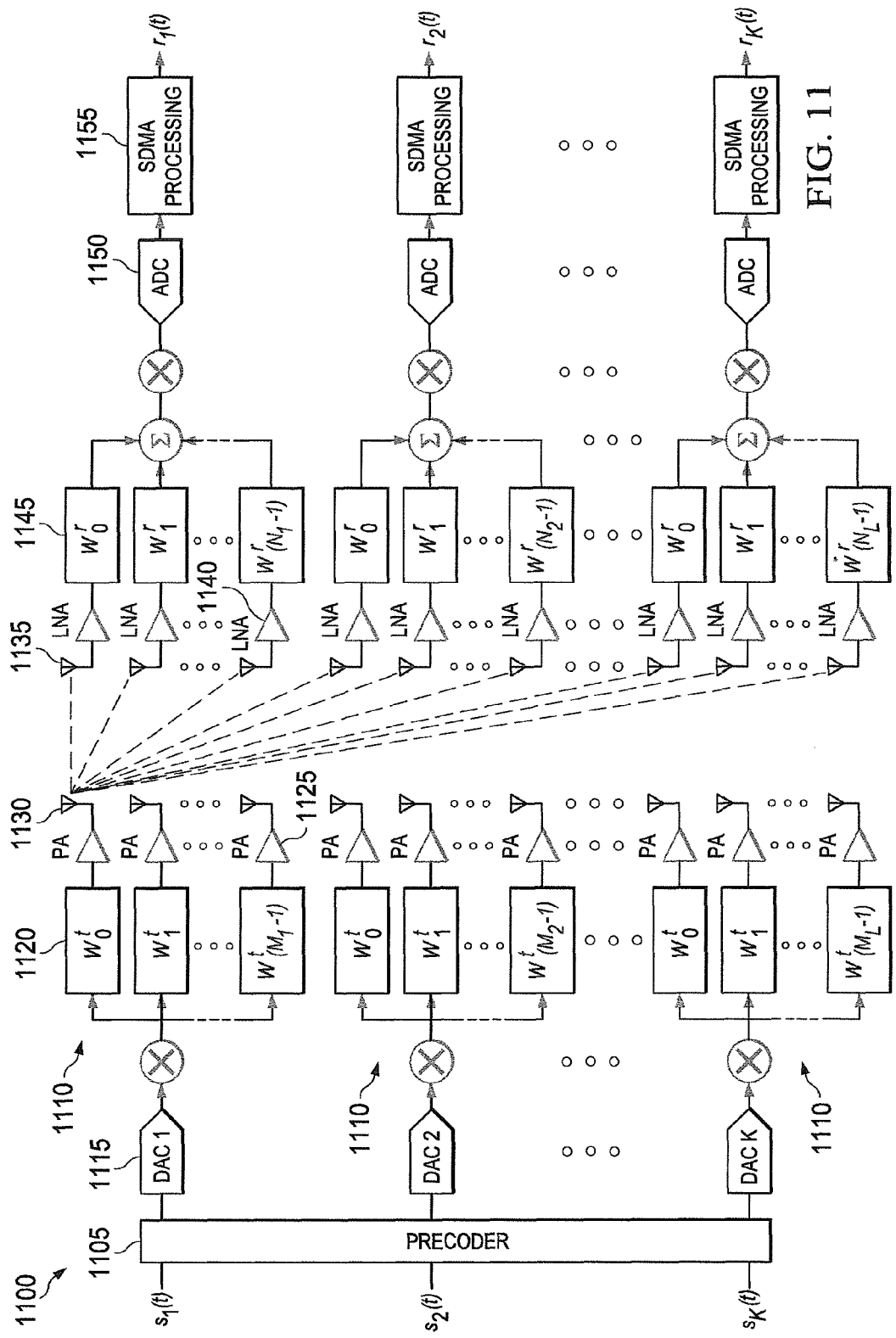
FIG. 11 illustrates a SDMA system according to embodiments of the present disclosure.

FIG. 11 illustrates a SDMA system according to embodiments of the present disclosure. The embodiment of the SDMA system 1100 shown in FIG. 11 is for illustration only. Other embodiments could be used without departing from the scope of this disclosure.

The SDMA system 1100 of FIG. 11 includes multiple streams ($S_1(t), S_2(t), \ldots S_k(t)$) going into a digital precoder 1105. The output of the precoder 1105 is sent to separate RF chains 1110, where there is a second level of analog precoding with a phased antenna array. Each RF chain 1110 includes a digital to analog converter (DAC) 1115, beamforming weighting 1120, and power amplifiers (PA) 1125 coupled to antenna arrays 1130. The significance of this architecture is that the arrays for each RF chain 1110 (called "sub-arrays") are independent and are not interconnected with each other. Thus, each RF chain is connected to one sub-array, leading to an array of sub-arrays structure for the antennas. Furthermore, in certain embodiments, the antennas 1130 in this SDMA system 1100 structure can have uniform spacing with each other and can be considered to operate as a single unit. The SDMA system 1100 architecture can flexibly switch between single user and multiple user systems using the digital precoder(s) 1105 with effective utilization of all the antennas 1130 and phase shifters and providing beamforming gains 1120.

A receiver in the SDMA system 1110 includes a comparable arrangement. That is, the receiver receives a signal from the transmitter via a plurality of chains. In each RF chain, the signal is received by at least one of a number of antennas 1135 amplified by LNAs 1140, beamforming weights applied 1145, converted by Analog to Digital Converters (ADC) 1150 and processed by SDMA processing circuitry 1155.

In the embodiments illustrated, there are U users and S streams per user. In addition, the number of RF chains is K while the total number of antennas per RF chain be N.

Figure 12:
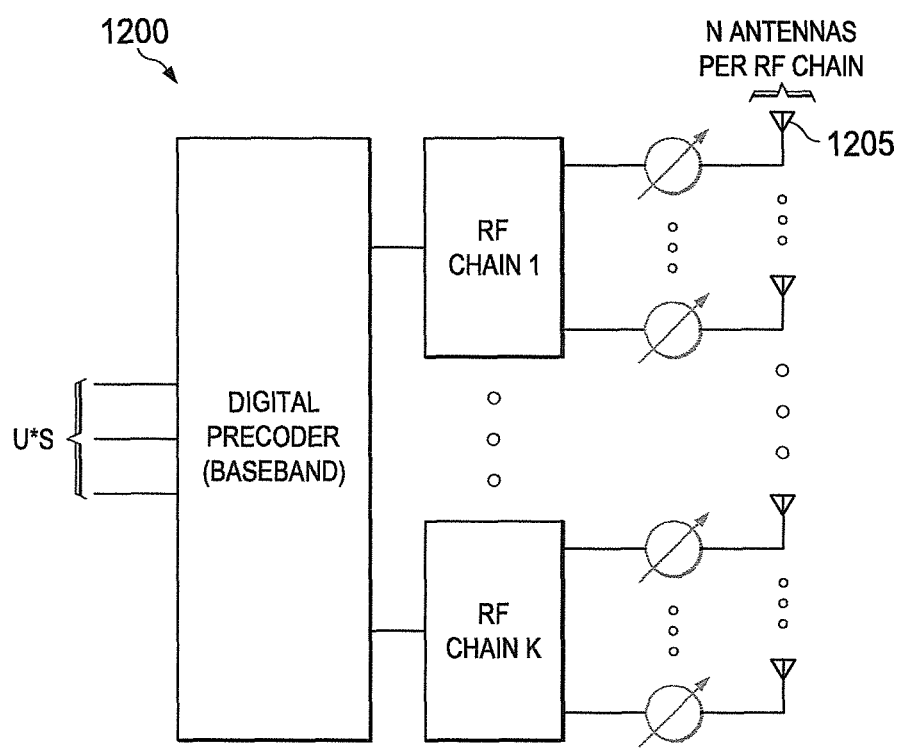
FIG. 12 illustrates a SDMA architecture according to embodiments of the present disclosure.

FIG. 12 illustrates an SDMA architecture according to embodiments of the present disclosure. The SDMA architecture 1200 shown in FIG. 12 is without interconnection between RF chains and antennas. The embodiment of the SDMA architecture 1200 without interconnection between RF chains and antennas shown in FIG. 12 is for illustration only. Other embodiments could be used without departing from the scope of this disclosure.

The SDMA architecture 1200 greatly simplifies the implementation of the hybrid beamforming architecture 900 shown in FIG. 9. For example, if the number of antennas 1205, for comparison, is maintained as N, the number of phase shifters and combiners is reduced. That is, the number of phase shifters reduces to N/K and there is no need for any combiners. Alternately, by maintaining the same number of phase shifters, this SDMA architecture 1200 provides a tradeoff for each combiner with an antenna, providing K times more antennas compared to FIG. 9.

Additionally, the SDMA architecture 1200 provides for reduced interconnect complexity. For example, in the system of FIG. 9, each RF chain 910 is coupled to each antenna 915. Therefore, at least RF chain 910 is disposed a considerable distance from a respective antenna 915. The path length from the furthest RF chain 910 to the respective antenna introduces losses and constraints on the system.

While the traditional architecture provides a beamforming gain of N per RF chain, the new SDMA architecture 1200 can provide a beamforming gain between N and N*K (assuming each combiner is replaced by an antenna), where the gain is dependent upon the direction of transmission and reception. The beamforming gain is K*N when all the antennas are pointed in the same direction.

Figure 13:
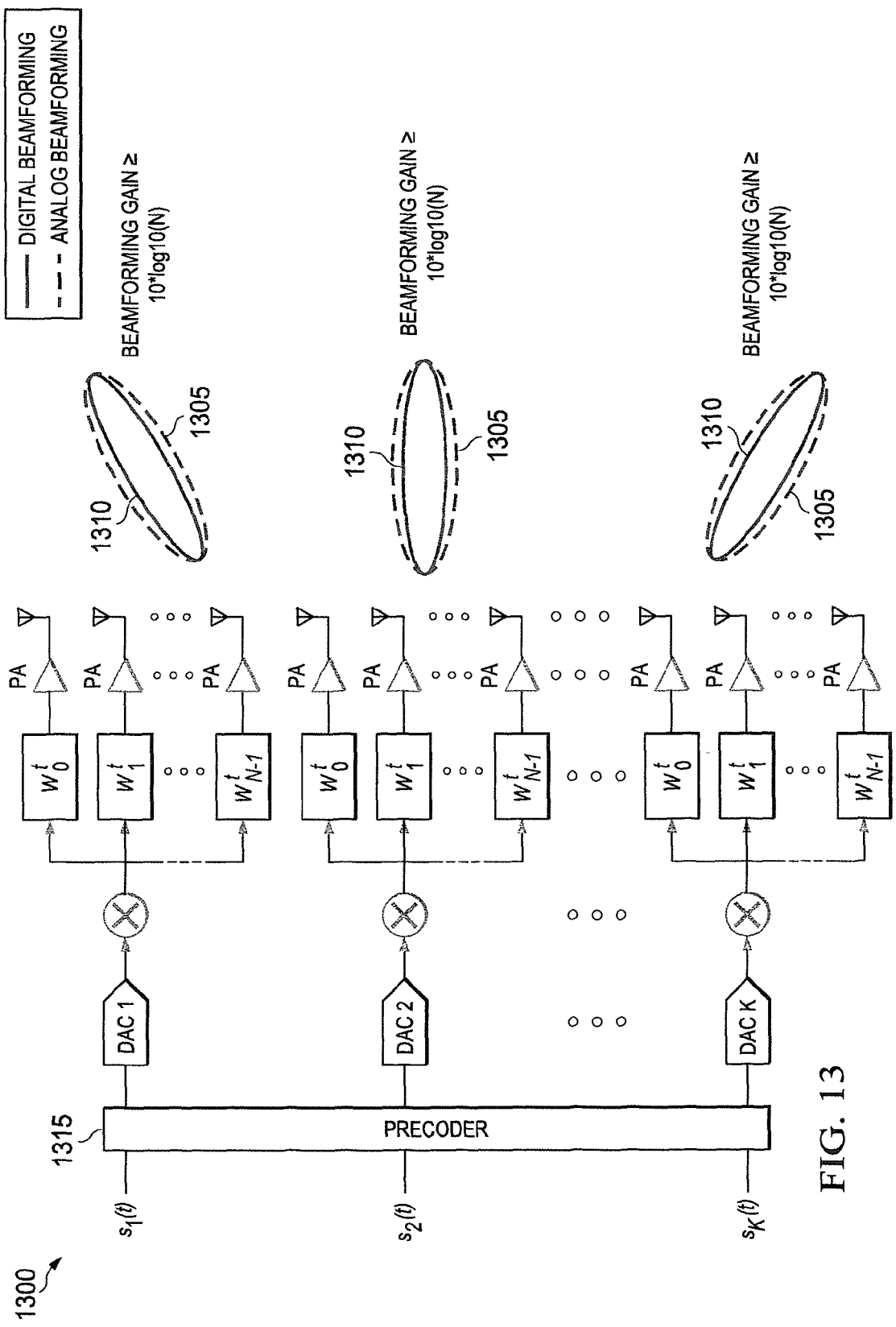
FIGS. 13-16 illustrate beamforming gain according to embodiments of the present disclosure.

FIG. 13 illustrates beamforming gain according to embodiments of the present disclosure. In the transmitter 1300 system shown in FIG. 13, users are scheduled in different directions. The embodiment of the transmitter 1300 system and beamforming gain shown in FIG. 13 is for illustration only. Other embodiments could be used without departing from the scope of this disclosure.

Analog beamforming 1305 is used to shape the general direction of the beam and digital beamforming 1310 operates within the shape decided by the analog beamforming. For example, in FIG. 13, when all users are pointing in different directions, if the analog beamforming 1305 for each RF chain points in a different direction, the beamforming gain for each direction will be at least equal to $10*\log 10(N)$, where N is the number of antennas per RF chain. That is, the beamforming gain for each direction can be defined according to Equation 1:

$$10*\log 10(N) \leq \text{Beamforming gain} \leq 10*\log 10(N*K) \quad \text{[Eqn. 1]}$$

When the users are pointed in substantially different directions, the digital precoder 1315 does not have a significant impact on the beamforming gain. However, the digital precoder 1315 weights may be used for power allocation or for compensating for the channel response, for example. Both the amplitude and phase of the digital precoder 1315 can be changed to attain the desired functionality.

Figure 14:
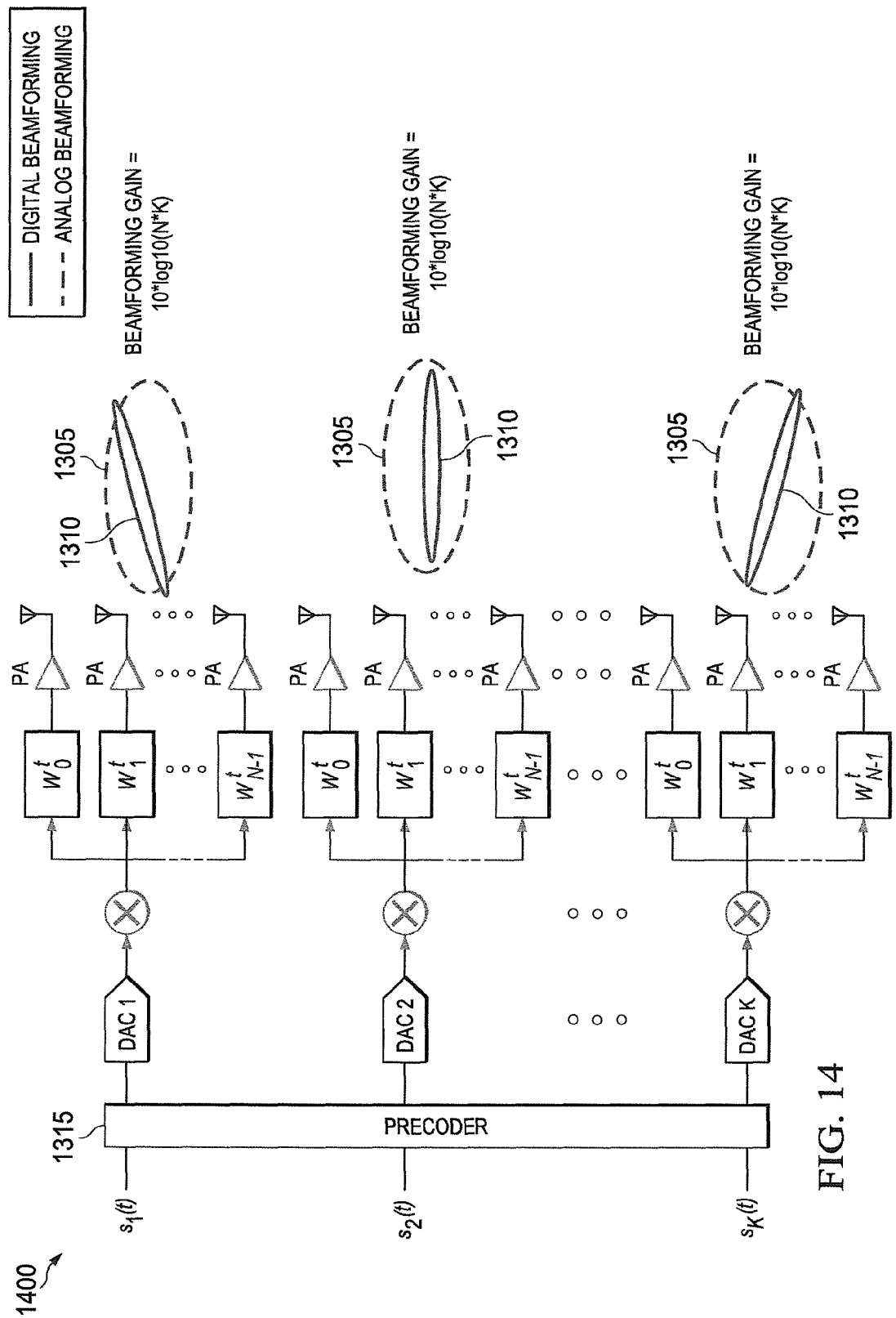

FIG. 14 illustrates beamforming gain according to embodiments of the present disclosure. In the transmitter 1400 system shown in FIG. 14, all users are scheduled in the same direction. The embodiment of the transmitter 1400 system and beamforming gain shown in FIG. 14 is for illustration only. Other embodiments could be used without departing from the scope of this disclosure.

When all users are in the same direction, a beamforming gain of $10*\log 10(K*N)$ is obtained for the system for all users. However, this assumes that the users are able to cancel the signals from other users using digital beamforming (precoding) to separate the users in space and using interference cancellation techniques to suppress any residual interference.

Figure 15:
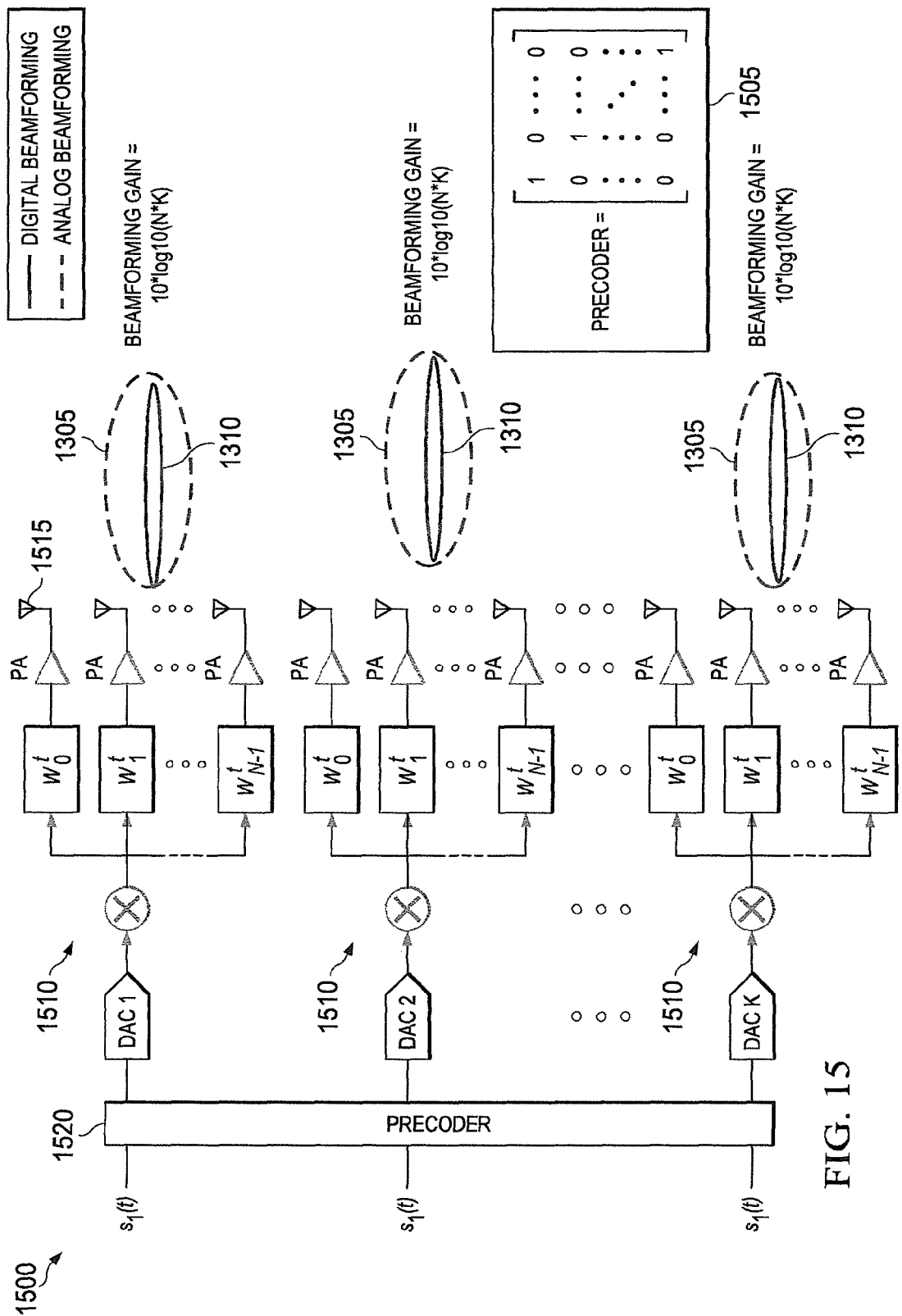

FIG. 15 illustrates beamforming gain according to embodiments of the present disclosure. In the system shown in FIG. 15, the transmitter 1500 employs a single-user configuration according to embodiments of the present disclosure. The embodiment of the transmitter 1500 system and beamforming gain shown in FIG. 15 is for illustration only. Other embodiments could be used without departing from the scope of this disclosure.

In certain embodiments, the antennas are flexibly configured to act as a single-user system by using a unitary precoding matrix 1505 and sending the same signal to all RF chains 1510. In this case, all the antennas 1515 in the system are used to get a beamforming gain of $10*\log 10(N*K)$ by sending the same signal to all precoders 1520 and by using a unitary precoder 1505 of size K×K, where K is the number of RF chains 1510.

Figure 16:
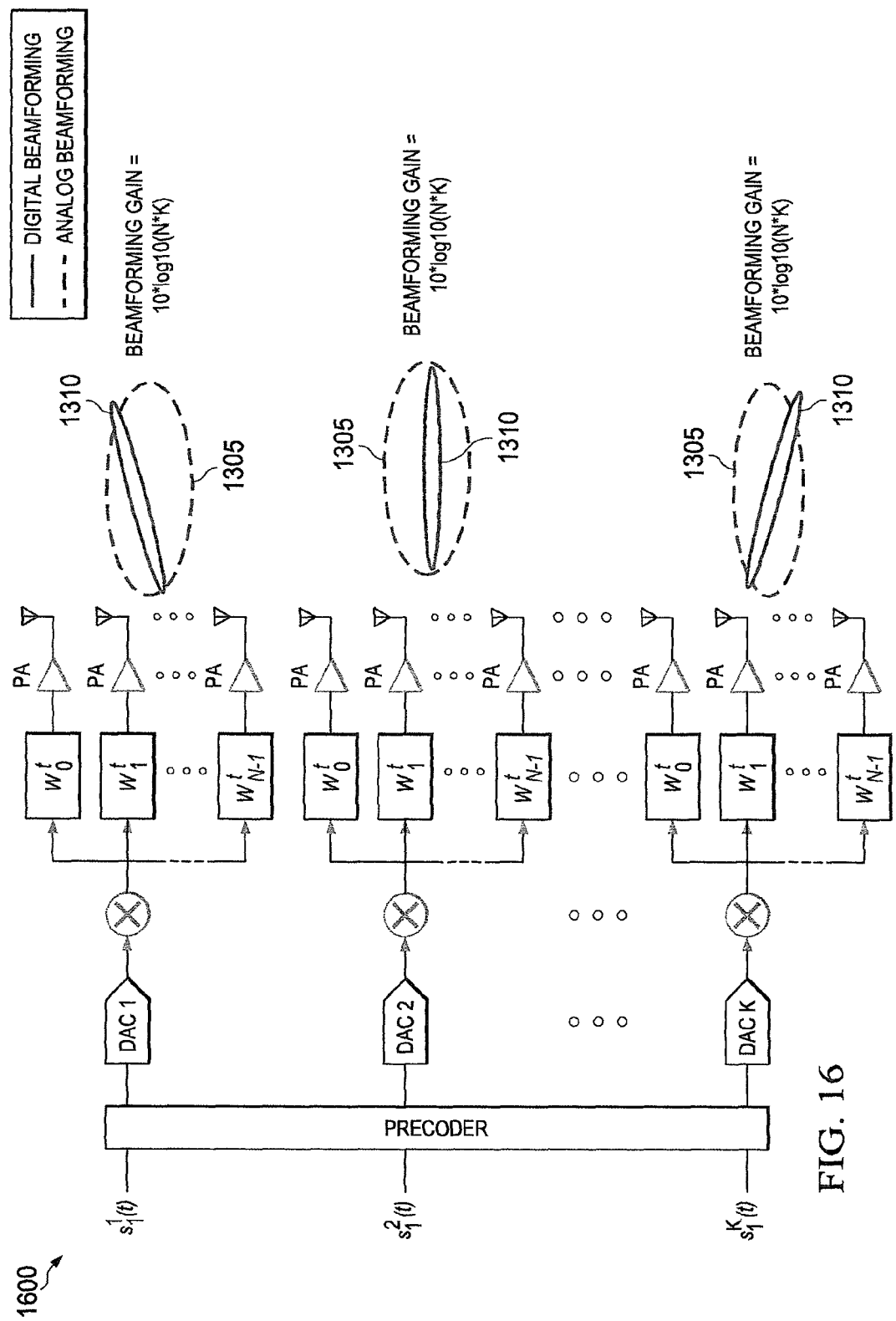

FIG. 16 illustrates beamforming gain according to embodiments of the present disclosure. In the system shown in FIG. 16, the transmitter 1600 employs a single-user multiple-streams configuration according to embodiments of the present disclosure. The embodiment of the transmitter 1600 system and beamforming gain shown in FIG. 16 is for illustration only. Other embodiments could be used without departing from the scope of this disclosure.

In certain embodiments, multiple streams can be sent to a single user as shown in FIG. 16. In certain embodiments, the transmitter 1600 can transmit a combination of multiple streams to a single user as well as spatially multiplexing the signals several users.

Figure 17A:
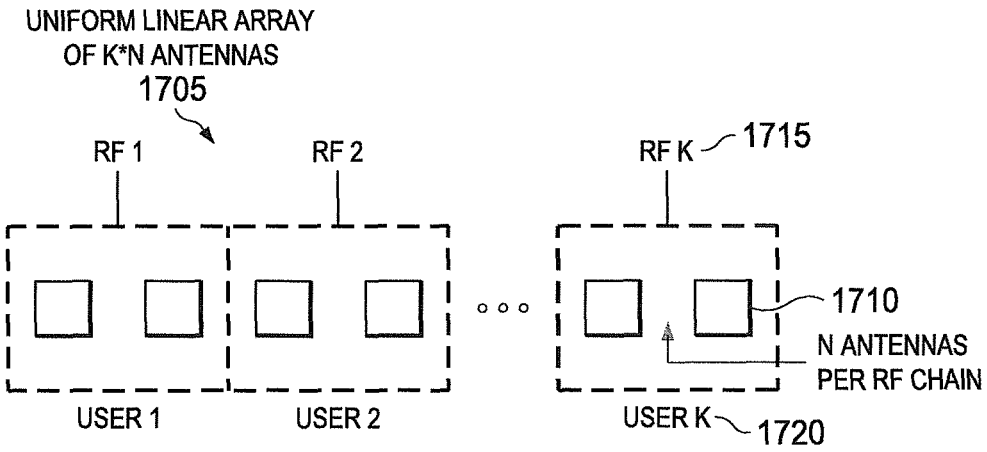
FIGS. 17A and 17B illustrate antenna array types according to embodiments of the present disclosure.
Figure 17B:
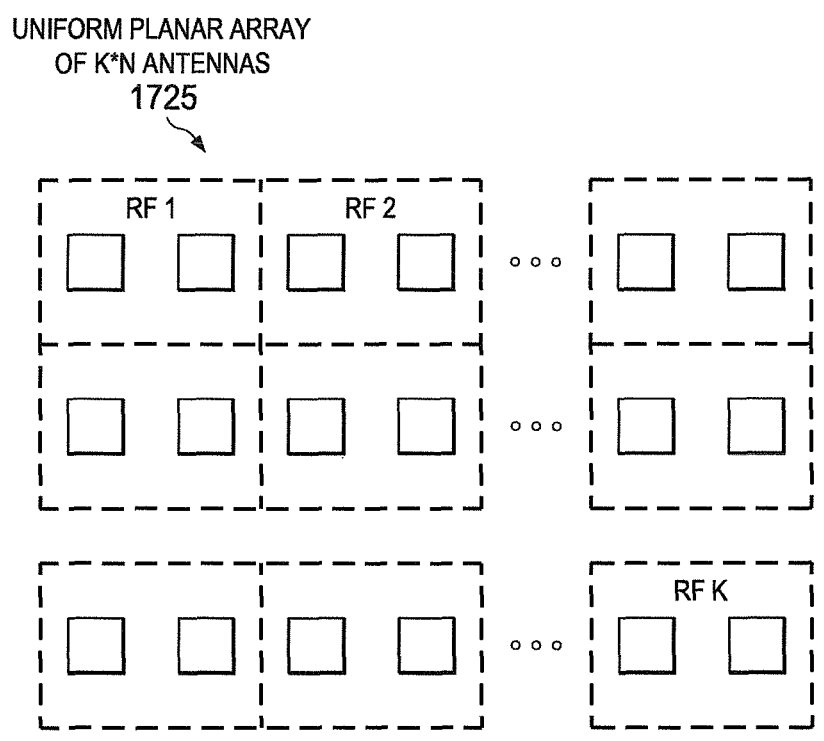

FIGS. 17A and 17B illustrate antenna array types according to embodiments of the present disclosure. The embodiments of the array types shown in FIGS. 17A and 17B are for illustration only. Other embodiments could be used without departing from the scope of this disclosure.

In certain embodiments, as illustrated herein above, the antenna array is configured as a uniform linear array 1705. The uniform linear array 1705 includes N antennas 1710 per RF chain 1715 per user 1720. In certain embodiment, the antenna array is configured as another array structures such as a 2-D planar array 1725.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a transmitter comprising:
a baseband precoder configured to precode a plurality of input signals;
a plurality of Radio frequency (RF) chains;
an array of sub-array antennas, wherein each of the plurality of RF chains configured to apply a phase shift and beamforming weight to one of the plurality of input signals,
wherein each of the plurality of RF chains is coupled to a respective sub-array antenna of the array of sub-array antennas,
wherein the baseband precoder and the plurality of RF chains are configured to apply a gain based on a direction of transmission of each of the plurality of input signals, and
wherein the transmitter is configured to apply a plurality of RF beamforming weights and a plurality of digital beamforming weights to provide a plurality of signals to a plurality of users.

2. The transmitter as set forth in claim 1, wherein the baseband precoder comprises a digital precoder configured to apply a digital beamforming weight to the signal.

3. The transmitter as set forth in claim 1, wherein the baseband precoder provides a first precoded signal to a first RF chain coupled to a first antenna sub-array and a second precoded signal to a second RF chain coupled to a second antenna sub-array.

4. The transmitter as set forth in claim 1, wherein the array of sub-array antennas comprises at least one of: a two-dimensional array and a linear array.

5. The transmitter as set forth in claim 1, wherein the gain is a complex gain comprising a phase and amplitude.

6. For use in a wireless communication network, a transmitter comprising:
a baseband precoder configured to precode a plurality of input signals;
an array of sub-array antennas; and
a plurality of radio frequency (RF) chains configured to apply a plurality of phase shifts and a plurality of beamforming weight to the plurality of input signals, wherein each of the plurality of RF chains is coupled to a respective sub-array antenna of the array of sub-array antennas,
wherein the baseband precoder and the plurality of RF chains are configured to apply a gain based on a direction of transmission of each of the plurality of input signals,
wherein the transmitter is configured to apply a plurality of RF beamforming weights in a first direction using a first beam width and a plurality of digital beamforming weights in a second direction using a second beam width, and
wherein the RF beamforming configured to determines an RF beam shape,
wherein the digital beamforminq configured to have a digital beam shape within the RF beam shape determined by the RF beamforminq.

7. The transmitter as set forth in claim 6, wherein the first direction and the second direction are a same direction.

8. The transmitter as set forth in claim 7, wherein the signal is configured for a single user, and wherein the baseband precoder comprises a unitary precoding matrix and is configured to provide a same precoded signal to each of the RF chains to provide multiple streams of the precoded signal to the single user, wherein each stream is transmitted from a respective antenna sub-array of the array of sub-array antennas.

9. The transmitter as set forth in claim 6, wherein the first direction is a same direction for each antenna sub-array and the second direction of a first antenna sub-array is different than the second direction of a second antenna sub-array.

10. For use in a wireless communication network, a method comprising:
preceding, by a baseband precoder, a plurality of input signals for spatial division multiple access (SDMA);
applying, by each of a plurality of radio frequency (RF) chains, a plurality of phase shifts and a plurality of beamforming weights to the plurality of input signals; and
transmitting the plurality of phase shifted and weighted input signals by an array of sub-array antennas,
wherein each of the plurality of RF chains is coupled to a respective sub-array antenna of the array of sub-array antennas,
wherein a gain applied to each of the plurality of input signals is based on a direction of transmission of each of the plurality of input signals, and
wherein a plurality of RF beamforming weights is applied and a plurality of digital beamforming weights is applied to provide a plurality of signals to a plurality of users.

11. The method as set forth in claim 10, wherein the baseband precoder comprises a digital precoder and precoding further comprises applying a digital beamforming weight to the signal.

12. The method as set forth in claim 10, wherein precoding further comprises providing a first precoded signal to a first RF chain coupled to a first antenna sub-array and a second precoded signal to a second RF chain coupled to a second antenna sub-array.

13. The method as set forth in claim 10, wherein the array of sub-array antennas comprises at least one of: a two-dimensional array and a linear array.

14. The method as set forth in claim 10, wherein the gain is a complex gain comprising a phase and amplitude.

15. For use in a wireless communication network, a method comprising:
precoding, by a baseband precoder, a plurality of input signals for spatial division multiple access (SDMA);
applying, by each of a plurality of radio frequency (RF) chains, a plurality of phase shifts and a plurality of beamforming weights to the plurality of the input signals; and
transmitting the plurality of the phase shifted and weighted signals by an array of sub-array antennas,
wherein each of the plurality of RF chains is coupled to a respective sub-array antenna of the array of sub-array antennas, wherein a gain applied to the signal is based on a direction of transmission of the signal, and
wherein a plurality of RF beamforming weights is applied in a first direction and a plurality of digital beamforming weights is applied in a second direction.

16. The method as set forth in claim 15, wherein the first direction and the second direction are a same direction.

17. The method as set forth in claim 16, wherein the signal comprises a signal for a single user and the baseband precoder comprises a unitary precoding matrix, and wherein precoding comprises providing a same precoded signal to each of the RF chains to provide multiple streams of the precoded signal to the single user, and wherein transmitting comprises transmitting each stream from a respective antenna sub-array of the array of sub-array antennas.

18. The method as set forth in claim 15, wherein the first direction is a same direction for each antenna sub-array and the second direction of a first antenna sub-array is different than the second direction of a second antenna sub-array.

* * * * *